(12) United States Patent
Vaughey et al.

(10) Patent No.: US 6,855,460 B2
(45) Date of Patent: Feb. 15, 2005

(54) NEGATIVE ELECTRODES FOR LITHIUM CELLS AND BATTERIES

(75) Inventors: John T. Vaughey, Elmhurst, IL (US); Linda M. L. Fransson, Uppsala (SE); Michael M. Thackeray, Naperville, IL (US)

(73) Assignee: The University of Chicago, Chicago, IL (US)

( * ) Notice: Subject to any disclaimer, the term of this patent is extended or adjusted under 35 U.S.C. 154(b) by 333 days.

(21) Appl. No.: 10/068,230

(22) Filed: Feb. 4, 2002

(65) Prior Publication Data

US 2002/0136953 A1 Sep. 26, 2002

Related U.S. Application Data

(60) Provisional application No. 60/267,512, filed on Feb. 8, 2001.

(51) Int. Cl.[7] .............................. H01M 4/38; H01M 4/49
(52) U.S. Cl. ................................ 429/218.1; 429/231.1; 429/231.95; 429/220
(58) Field of Search .............................. 429/218.1, 232, 429/231.1, 231.95, 220

(56) References Cited

U.S. PATENT DOCUMENTS

| | | | |
|---|---|---|---|
| 5,294,503 A | | 3/1994 | Huang et al. |
| 5,770,333 A | * | 6/1998 | Saito et al. ................ 429/326 |
| 6,090,505 A | * | 7/2000 | Shimamura et al. ...... 429/218.1 |
| 6,541,157 B1 | * | 4/2003 | Inagaki et al. ............ 429/231.9 |

FOREIGN PATENT DOCUMENTS

JP     11040155     12/1999

OTHER PUBLICATIONS

Hultgren et al., editors, "Selected Values of the Thermodynamic Properties of Binary Alloys", American Society for Metals, pag 787 and 789, 1973.*
Fransson et al., "Phase transitions in lithiated Cu2Sb anodes for lithium batteries: an in–situ X–ray diffraction study" Electrochemistry Communications (2001), 3(7) 317–323.*
Thackeray et al., "Structural considerations of intermetallic electrodes for lithium batteries", Journal of Power Sources (2003) 113(1) 124–130.*

(List continued on next page.)

Primary Examiner—Carol Chaney
(74) Attorney, Agent, or Firm—Emrich & Dithmar LLC; Harry M. Levy

(57) ABSTRACT

A negative electrode is disclosed for a non-aqueous electrochemical cell. The electrode has an intermetallic compound as its basic structural unit with the formula $M_2M'$ in which M and M' are selected from two or more metal elements including Si, and the $M_2M'$ structure is a $Cu_2Sb$-type structure. Preferably M is Cu, Mn and/or Li, and M' is Sb. Also disclosed is a non-aqueous electrochemical cell having a negative electrode of the type described, an electrolyte and a positive electrode. A plurality of cells may be arranged to form a battery.

22 Claims, 11 Drawing Sheets

OTHER PUBLICATIONS

Small Particle Size Multiphase Li–Alloy Anodes for Lithium–Ion–Batteries, J. Yang, M.Winter, J.O. Besenhard.

Tin–Based Amorphous Oxide: A High–Capacity Lithium–Ion–Storage Material; W.W.W.Sciencemag.org Science Vol. 276 May 30, 1997.

Handbook of Battery Material, Jurgen O. Besenhard (Ed.) Wiley–VCH, pp. 360–379 no date.

A Brief History of Lithium Alloys in Room Temperature Lithium Batteries, M. Winter J.O. Besenhard Electrochimica Acta 45 no date.

Active/Inactive Nanocomposites as Anodes for Li–Ion Batteries Electrochemical and Solid–State Letters.2 (1) 3–5– (1999).

$Li_x Cu_6 Sn_5$ (0<X<13) :An Intermetallic Insertion Electrode for Re–Chargeable Lithium Batteries, Electrochemical and Solid–State Letters, 2(7) 307–309) (1999).

Intermetallic Insertion Electrodes with a Zinc Blende–Type Structure for Li Batteries: A Study of $Li_x InSb$ (0x<x<3) Electro–Chemical and Solid–State Letters, 3 (1) 13–16 (2000).

Electrochemistry and In–Situ X–Ray Diffraction of InSb in Lithium Batteries, Electrochemistry Communications 2(2000) 595–600.

Crystal Structures, Ralph W.G. Wyckoff, University of Arizona.

Ternare Phosphide und Arsenide Des Lithiums Mit Eisen Kobalt Oder Chrom im $CU_2Sb$–Typ Von R. Juza und K. Langer pp. 58–73.

\* cited by examiner

NEGATIVE ELECTRODES FOR LITHIUM CELLS AND BATTERIES

RELATED APPLICATIONS

This application, pursuant to 37 C.F.R. § 1.78(c), claims priority based on Provisional application Ser. No. 60/267,512 filed Feb. 8, 2001.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

BACKGROUND OF THE INVENTION

Field of the Invention

This invention relates to new intermetallic negative electrodes (anodes) for lithium batteries. According to the invention, the intermetallic electrodes are based on a formulation that for a binary system of two different metal elements, M and M', including Si, can be represented $M_2M'$ with a $Cu_2Sb$-type structure. The invention extends to include ternary, quaternary and higher order intermetallic electrodes in which the M and M' atoms can be of more than one atom type. The intermetallic compounds of the present invention need not be ordered systems; that is, they may have fully disordered structures in which the M or M' atoms are arranged in a random manner, or they may have partially disordered structures in which the M or M' atoms in the crystal lattice are arranged in a non-random manner. The M atoms of this invention are preferentially Cu, Li and/or Mn atoms, and the M' atoms are preferentially Sb atoms.

SUMMARY OF THE INVENTION

Rechargeable lithium cells (and batteries), commonly referred to as lithium-ion cells (and batteries) have found widespread application for powering devices such as cellular phones, laptop and hand-held computers and camcorders; they are also of interest for larger applications such as stand-by energy storage, electric and hybrid-electric vehicles. The most common lithium-ion cell has the configuration $Li_xC$/electrolyte/$Li_{1-x}CoO_2$. During charge and discharge, lithium ions are shuttled electrochemically between two host electrode structures that consist of a carbonaceous (typically graphitic) $Li_xC$ anode and a layered $Li_{1-x}CoO_2$ cathode. These cells are inherently unsafe, particularly if heated in a charged state or if they are overcharged without protective electronic circuitry. Lithiated graphite electrodes operate at a potential very close to that of metallic lithium and are extremely reactive. There is, therefore, a need to find alternative electrodes to graphite.

According to this invention, there is described a new intermetallic structure type that can be effectively used as a negative electrode (anode) for a non-aqueous lithium electrochemical cell and/or battery. These new intermetallic electrodes have as their basic structural unit the formula $M_2M'$ in which M and M' are selected from two or more metal elements including Si, and have a $Cu_2Sb$-type structure. In this structure type, the M' atoms of the $M_2M'$ structure have a configuration that is close to an ideal face-centered-cubic array of atoms, and provide a host framework for the M atoms in the parent structure and for Li atoms during the electrochemical reaction. The M atoms of this invention are preferably Cu, Mn and/or Li atoms, and the M' atoms are preferably Sb atoms.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE PREFERRED EMBODIMENTS

Figure 1:
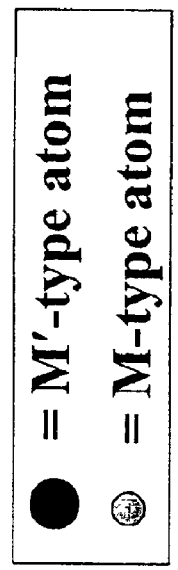
FIG. 1 depicts a schematic illustration of the $M_2M'$ structure of the invention.
Figure 1:
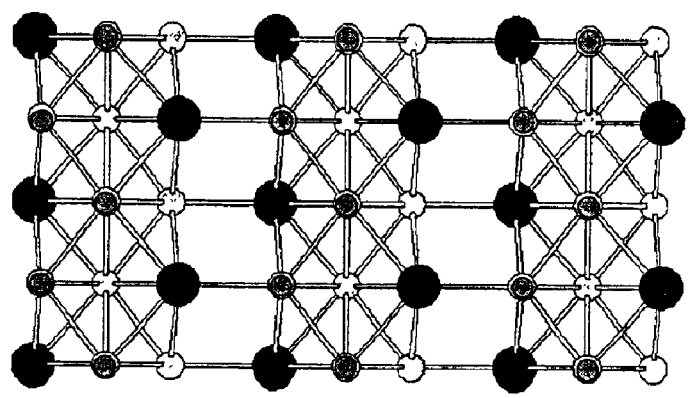
Figure 1A:
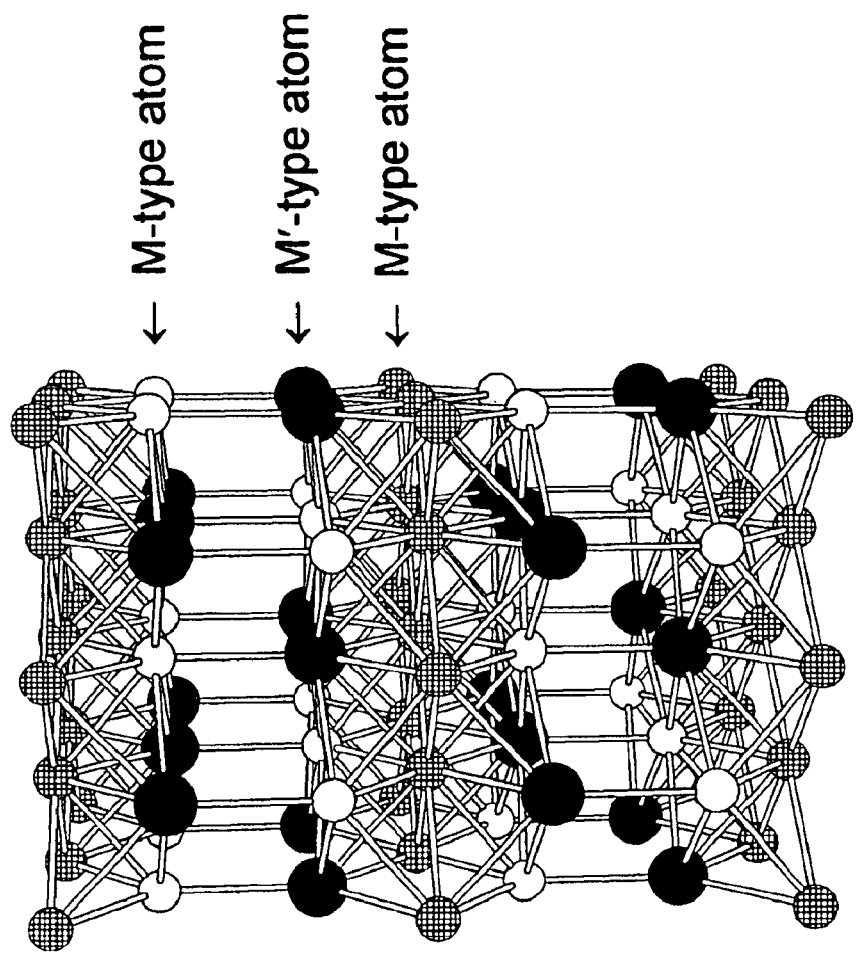

A renewed interest in intermetallic negative electrodes as alternatives to graphite for lithium-ion batteries has developed over recent years because of the inherent safety hazards of these cells, particularly when subject to abuse or overcharge conditions. Binary lithium-metal systems such as $Li_xAl$, $Li_xSi$ and $Li_xSn$ have not yet found practical application because the expansion and contraction that occurs during lithiation and delithiation is so large that the structural integrity and cycle life of the electrode is impaired as described by Huggins in: Handbook of Battery Materials (Editor: J. O. Besenhard), Wiley-VCH, Wienheim, Germany, Part III.1, page 359 (1999), the disclosure of which is incorporated by reference. One of the most common approaches to alleviate this problem is to embed an electrochemically active intermetallic electrode in a composite matrix. (By intermetallic electrode, it is meant that the electrode includes two or more metal elements including silicon.) Perhaps the best known composite system is derived from tin oxide, in which domains of lithiated tin, $Li_xSn$, are created within an electronically insulating $Li_2O$ matrix during the electrochemical reaction with lithium, a concept that was reported by Y. Idota et al in *Science*, Volume 276, page 570 (1997), the disclosure of which is incorporated by reference. A major problem with this system is that the electrode is subject to an unacceptably large irreversible capacity loss, which is attributed to the inability of the lithium trapped within the $Li_2O$ matrix to partake in the electrochemical reaction. There have been extensions to this concept, for example, to use two electronically conducting intermetallic components, one "active", such as $FeSn_2$, and the other "inactive", such as $Fe_3SnC$ as described by O. Mao et al in Electrochemical and Solid State Letters, Volume 2, page 3 (1999), the disclosure of which is incorporated by reference. It has also been recognized that in order to obtain high capacities and high rates, the particle size of these composite electrodes should be as small as possible, preferably with nanoscale dimensions. However, a disadvantage of this approach is that extremely small electrochemically active particles will be more prone to reaction with the organic-based electrolytes of lithium cells than larger sized particles. In another development, intermetallic compounds have been identified that operate by lithium insertion/metal extrusion reactions, the most notable being $Cu_6Sn_5$ with a nickel-arsenide-type structure that transforms to $Li_{4.4}Sn$ via a $Li_2CuSn$ lithiated zinc-blende-type intermediate structure as reported by Kepler et al in Electrochemical Solid State Letters, Volume 2, page 307 (1999), the disclosure of which is incorporated by reference and InSb with a zinc-blende-type structure that transforms on complete lithiation to $Li_3Sb$, as reported by Vaughey et al in Electrochemistry and Solid State Letters, Volume 3, page 13 (2000), the disclosure of which is incorporated by reference. The latter two examples described above have drawn attention to the existence of a new class of intermetallic compounds in which a strong structural relationship exists between a parent compound and its lithiated products. These types of compounds hold promise for improving the kinetics and reversibility of intermetallic anodes and for overcoming the safety limitations of lithiated graphite electrodes of state-of-the-art lithium-ion cells and batteries. However, further improvements in structural design are still required before such compounds can compete with graphite electrodes in lithium-ion cells and batteries.

According to this invention, there is described a new intermetallic structure type that can be effectively used as a negative electrode (anode) for a non-aqueous lithium electrochemical cell and/or battery. These new intermetallic electrodes have as their basic structural unit the formula $M_2M'$ in which M and M' are selected from two or more metals including Si, and the $M_2M'$ structure is a $Cu_2Sb$-type structure, as illustrated in FIG. 1. In this structure type, the M' atoms of the $M_2M'$ structure may have a configuration that is slightly distorted from an ideal face-centered-cubic array of atoms, and provide a host framework for the M atoms in the parent structure and for Li atoms during the electrochemical reaction. Lithium insertion into binary, ternary or higher order intermetallic compounds is often accompanied by the extrusion of metal atoms from the parent structure, but this is not necessarily always the case. When the M atoms are extruded from an $M_2M'$ electrode structure of this invention, then the electrode may be considered as a composite electrode that consists essentially of a matrix containing intermetallic $Li_xM_{2-y}M'$ particles having a host M' lattice containing x Li atoms and the remaining (2−y) M atoms, in intimate contact with the y M atoms that are extruded from the structure. The M atoms of this invention are preferably Cu, Mn and/or Li atoms, and the M' atoms are preferably Sb atoms, but may include Group Va elements excluding nitrogen.

In one embodiment of the invention, the parent intermetallic $M_2M'$ electrode can be a binary system of two different atom types, M and M', or it can be a ternary, a quaternary or a higher order intermetallic system in which the M and M' atoms can be of one atom type, or more than one atom type. The intermetallic compounds of the present invention need not be ordered systems; that is, they may have fully disordered structures in which the M or M' atoms are arranged in a random manner, or they may have partially disordered structures in which the M or M' atoms in the crystal lattice are arranged in a non-random manner. Furthermore, the $M_2M'$ compound of the invention need not be precisely stoichiometric, such that the M:M' ratio in the parent structure can fall within the range 2.33:1 to 1.67:1, and preferably within the range 2.1:1 to 1.9:1.

According to a second embodiment of the invention, the metal atoms of the intermetallic electrodes can be metals that are either active toward lithium, such as Sb, or inactive toward lithium, such as Cu or Mn, or the $M_2M'$ compound may be selected in which both M and M' are electrochemically active toward lithium. Preferably, for example, in a binary system $M_2M'$, the M atoms are substantially inactive toward lithium, such as Cu, and the M' atoms are substantially active toward lithium, such as Sb, which together with Li forms $Li_3Sb$. The M atoms are also preferably inactive toward the electrolyte.

One of the problems of intermetallic electrodes is that on the initial reaction with lithium, they tend to show an irreversible capacity loss, i.e., the capacity that is delivered on the initial insertion of lithium into the intermetallic host structure cannot be recovered during the subsequent lithium extraction reaction. Although not yet fully understood, this irreversible capacity loss is believed to be at least partly a result of the inability for all the extruded metal to be reincorporated into the structure, and partly by a passivation layer that is created on the surface of the lithiated intermetallic electrode, which renders some of the lithium inactive for further participation in the electrochemical reaction. Therefore, in a third embodiment of the invention, these effects may be countered by adding surplus M metal in finely divided form to the initial $M_2M'$ electrode of the invention, typically to the extent of 50 atom percent or less, preferably 20 atom percent or less. Alternatively, these effects may be countered by including some additional lithium in the parent $M_2M'$ electrode structure either as a separate component $M_2M'$, or by replacing some M or M' in the $M_2M'$ parent structure, for example, as $M_{2-\delta}Li_\delta M'$, in which δ is preferably less than 20 atom percent of the M atom content.

According to a further aspect of the invention, the electrochemical reaction may take place by lithium insertion into, and metal extrusion from, the face-centered-cubic M' metal array, such that the face-centered-cubic array is maintained during the electrochemical reaction. The reaction may also be one that proceeds to form $Li_xMM'$ structures in which MM' may be a zinc-blende-type framework. Further extrusion of the remaining M atoms from the $Li_xMM'$ structures can also be possible, while maintaining the face-centered-cubic M' metal array.

Compounds with the $Cu_2Sb$-type structure, in which the M' atom is a non-metal, such as $Fe_2As$, $Cr_2As$, $Cu_{(4-x)}Te_2$, LiFeAs, LiFeP, and LiCoAs are also known to exist as reported by Wyckoff in Crystal Structures, second edition, Wiley, Volume 1, page 361 (1965) and by Juza et al in Zeitschrift für Anorganische und Allegemeine Chemie, Volume 361, page 58 (1968) the disclosures of which are incorporated by reference. It is of particular significance that in the Li—Fe—As system, both $Fe_2As$ and LiFeAs have a $Cu_2Sb$-type structure, and that a solid solution between $Fe_2As$ and LiFeAs exists. In this instance, it may therefore be expected that when lithium is reacted electrochemically with $Fe_2As$, lithium will be inserted into, and iron extruded from, the As array and that the inserted Li atoms in the LiFeAs product will reside in the same crystallographic positions that were previously occupied by the extruded Fe atoms. Therefore, in a fourth embodiment of the invention, the $M_2M'$ electrode structure may be one in which M is selected from one or more metal elements and M' is selected from one or more metal or non-metal elements, preferably such that M' is selected from the Group Va elements, other than nitrogen, for example, P and/or As.

The principles of this invention are described with particular reference to the two isostructural compounds, $Cu_2Sb$ and $Mn_2Sb$. These two examples of intermetallic anodes describe the principles of the invention as contemplated by the inventors, but they are not to be construed as limiting examples.

EXAMPLE 1

$Cu_2Sb$ was synthesized by ball milling stoichiometric amounts of metallic copper and antimony with 5 at % graphite as a solid lubricant for 17 h in air using a SPEX/CertiPrep high-energy ball mill. The resultant powder was sieved through a mesh screen to isolate the electrode particles with size less than 75 µm.

EXAMPLE 2

Laminates of $Cu_2Sb$ electrodes were fabricated by mixing 84 wt % $Cu_2Sb$ as made in Example 1 with 8 wt % carbon (acetylene black) and 8 wt % polyvinylidine difluoride (PVDF). The electrode slurry was extruded onto copper-foil and vacuum-dried at 120° C. for at least 5 h prior to use. Two-electrode cells were assembled in an argon filled glovebox ($O_2$ and $H_2O$<5 ppm) using $Cu_2Sb$ as the working electrode and lithium as the counter electrode, separated by a glass fibre membrane soaked in electrolyte. A 1M $LiPF_6$ EC/DEC (ethylene carbonate/diethyl carbonate) (2:1) solution was used as electrolyte. $Li/Cu_2Sb$ cells were housed in an aluminum foil container.

Figure 2:
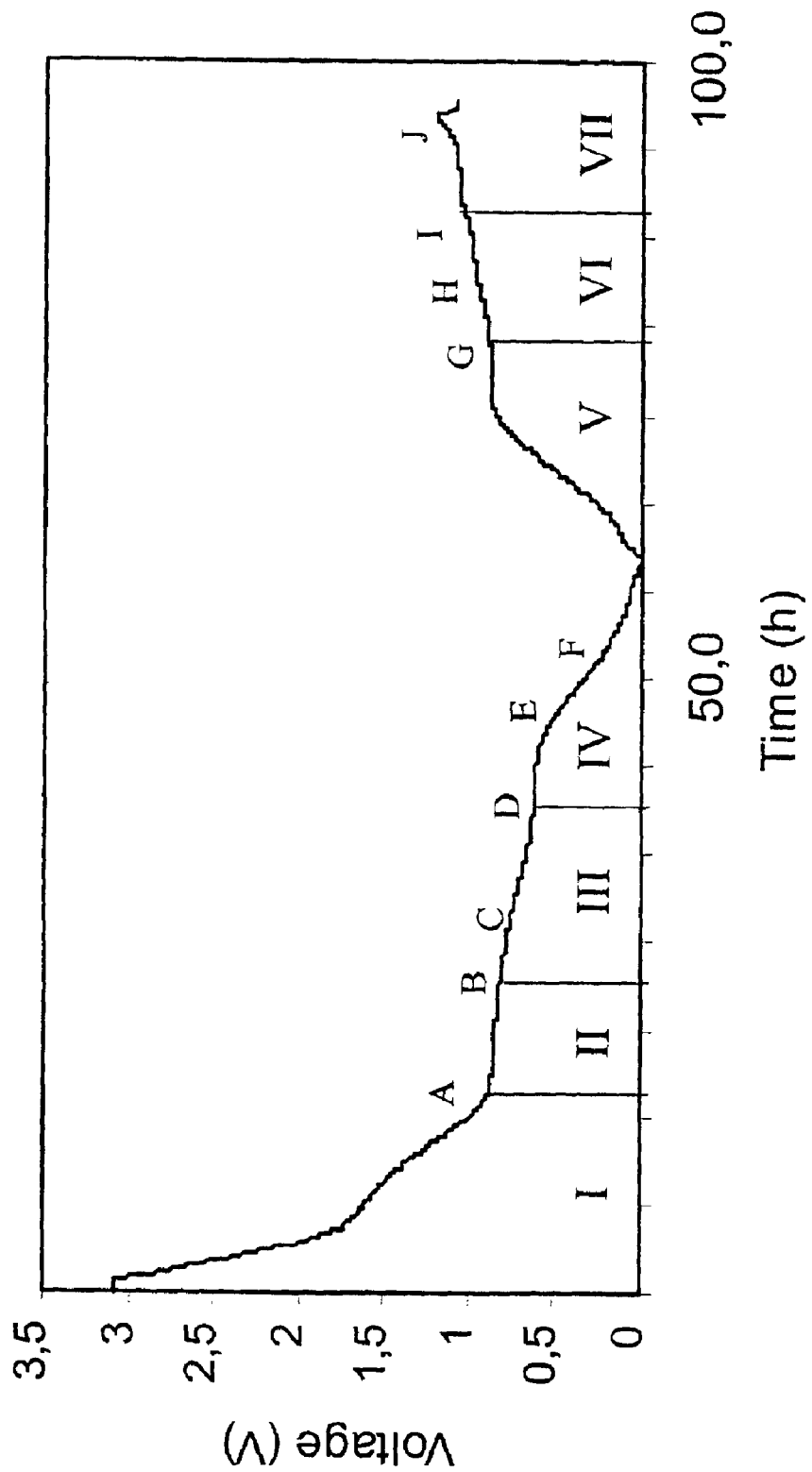
FIG. 2 depicts the voltage profile for the first cycle of a Li/$Cu_2Sb$ cell.
Figure 3:
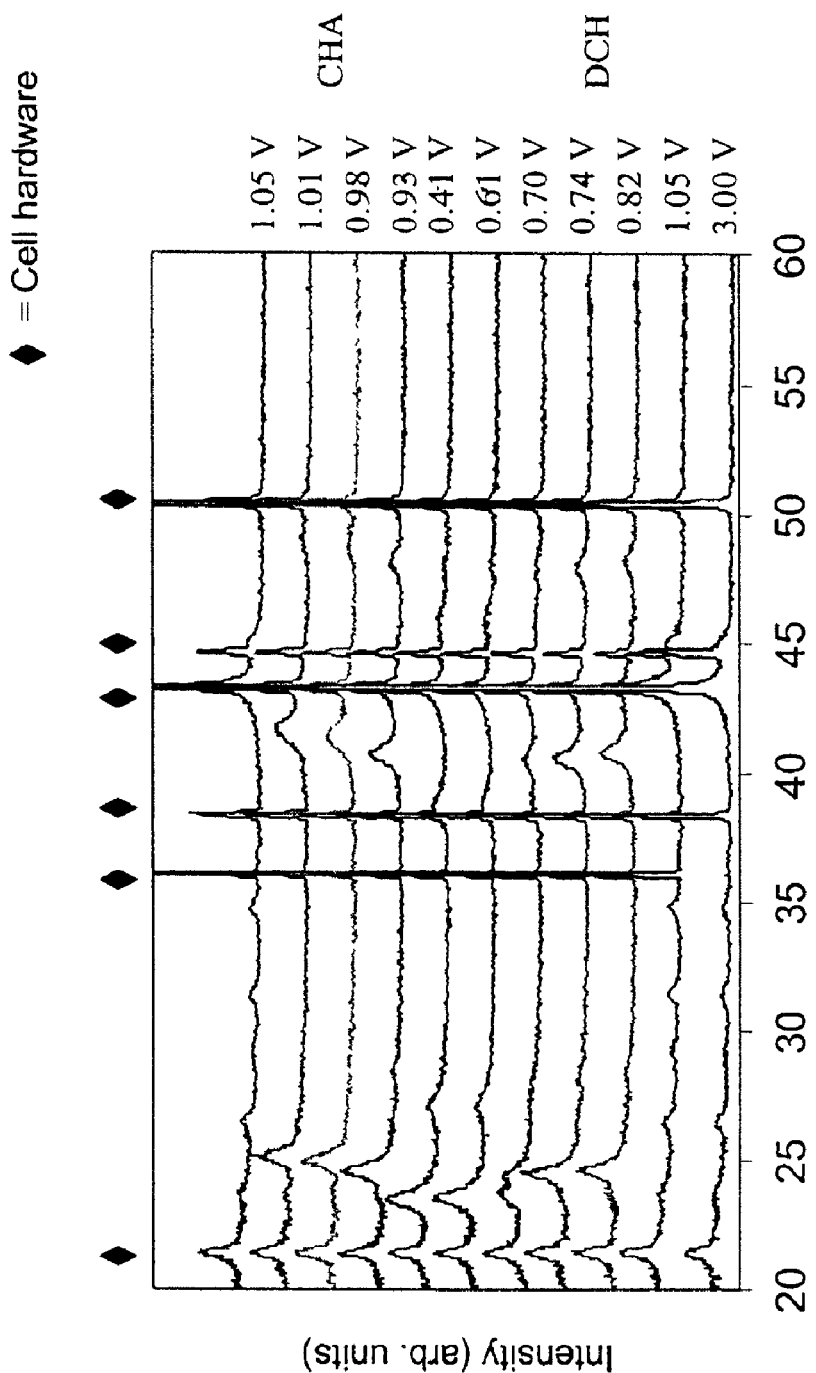
FIG. 3 depicts the X-ray diffraction patterns of the $Cu_2Sb$ electrode, collected in situ, in the Li/$Cu_2Sb$ cell of FIG. 2.
Figure 4:
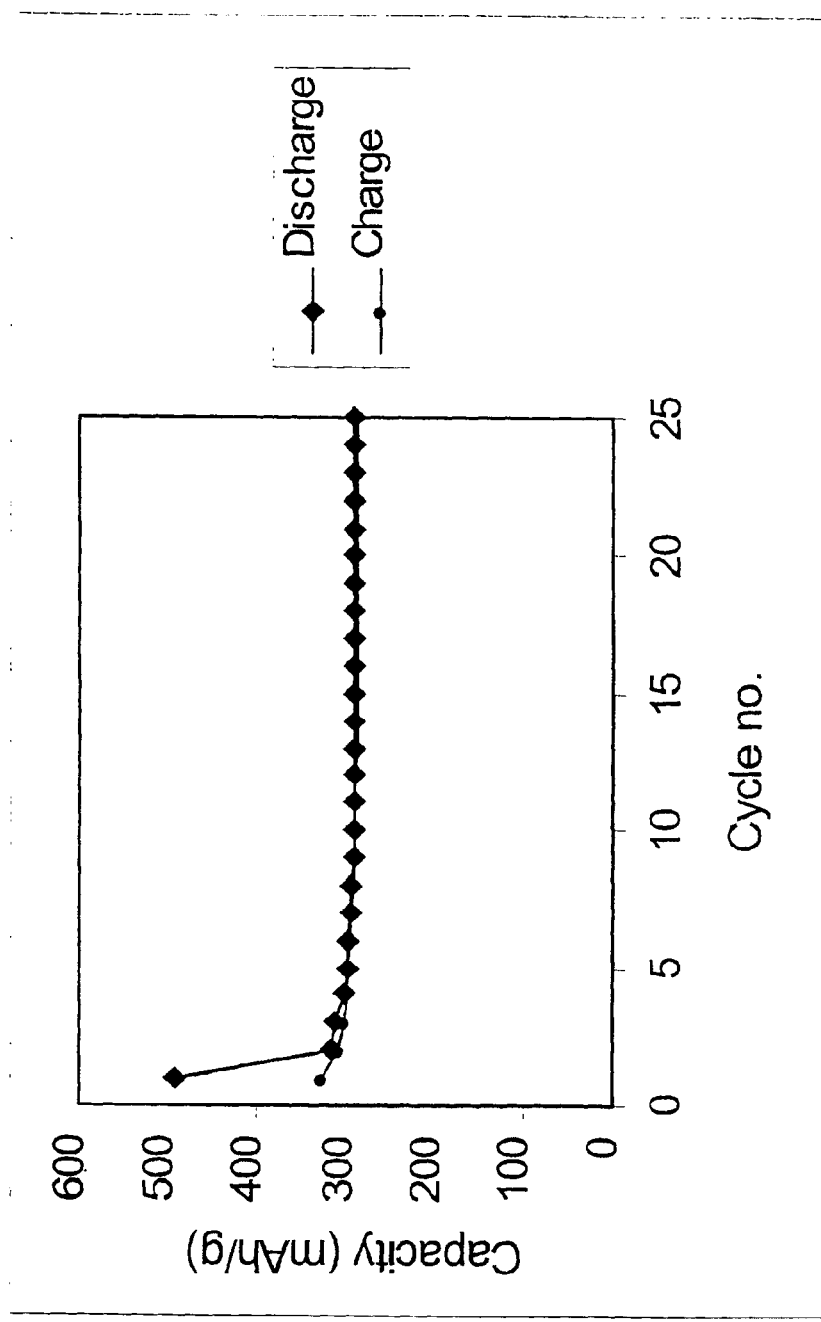
FIG. 4 depicts a plot of capacity vs. cycle number for the first 25 cycles of a Li/$Cu_2Sb$ cell.

The voltage profile of the first cycle of a $Li/Cu_2Sb$ cell, which was used for the in-situ X-ray diffraction data collection of the $Cu_2Sb$ electrode, is shown in FIG. 2. In situ X-ray diffraction data of the $Cu_2Sb$ electrode were collected during the initial discharge/charge cycle in transmission mode using a STOE & CIE GmbH STADI powder diffractometer fitted with a position-sensitive detector ($CuK\alpha_1$ radiation). Each measurement was recorded between 20° and 55° in 2θ. The $Li/Cu_2Sb$ cell was discharged and charged in potentiostatic mode on a MacPilell™ instrument with steps of 10 mV. The cell was allowed to equilibrate before each diffraction pattern was recorded. The powder X-ray diffraction patterns of the parent $Cu_2Sb$ electrode and the electrode at various states of discharge and charge are shown in FIG. 3. Unit cell parameters of the $Cu_2Sb$ electrode and its lithiated products were calculated by a least-squares refinement of the peak positions in the X-ray diffraction patterns of FIG. 2 ($CuK\alpha$ radiation). Cell cycling was performed on a second $Li/Cu_2Sb$ cell on a Digatron BTS-600 battery tester in galvanostatic mode with a current density of 0.2 mA/cm². Cells were cycled between 1.2 and 0.0 V. The capacity versus cycle number plot for the first 25 cycles of a second $Li/Cu_2Sb$ cell is shown in FIG. 4.

EXAMPLE 3

Figure 5:
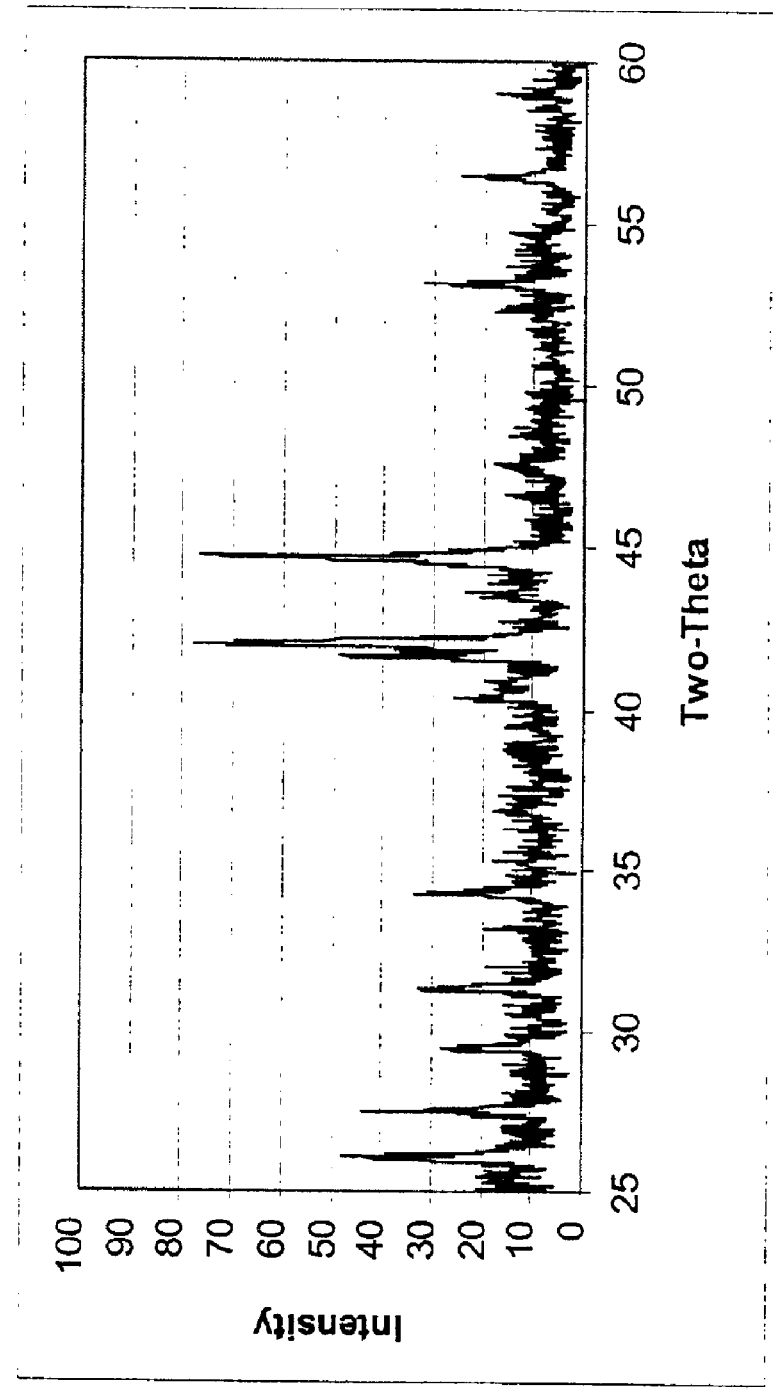
FIG. 5 shows the X-ray diffraction patterns of a $Mn_2Sb$ electrode.

$Mn_2Sb$ was synthesized by ball milling stoichiometric amounts of metallic manganese and antimony with 5 at % graphite as a solid lubricant for 17 h in air using a SPEX/CertiPrep high-energy ball mill. The resultant powder was sieved through a mesh screen to isolate the particles with size less than 75 µm. The powder X-ray diffraction pattern of the $Mn_2Sb$ product is shown in FIG. 5 ($CuK\alpha$ radiation).

EXAMPLE 4

Figure 6:
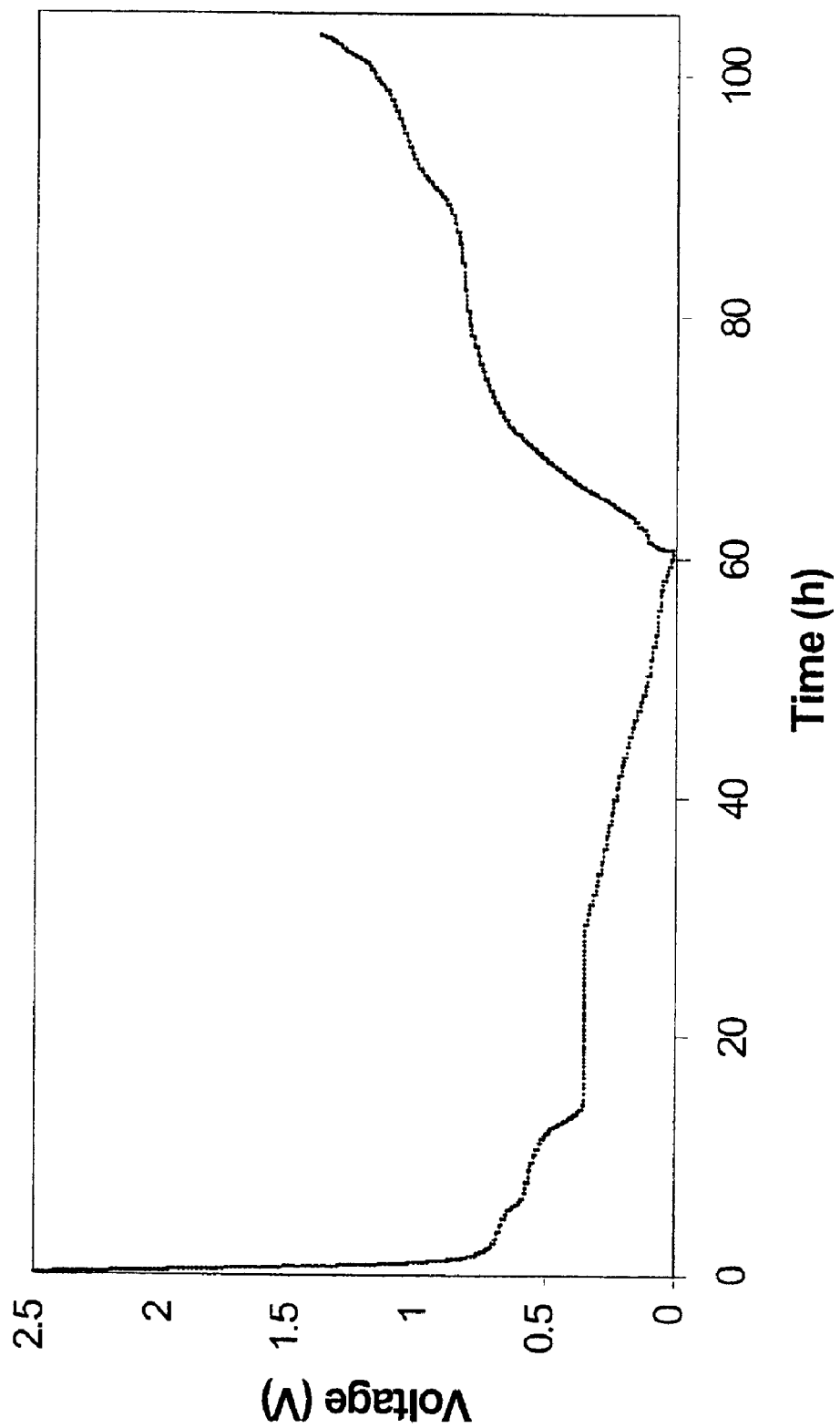
FIG. 6 shows the voltage profile of the first discharge/charge of a Li/$Mn_2Sb$ cell.
Figure 7:
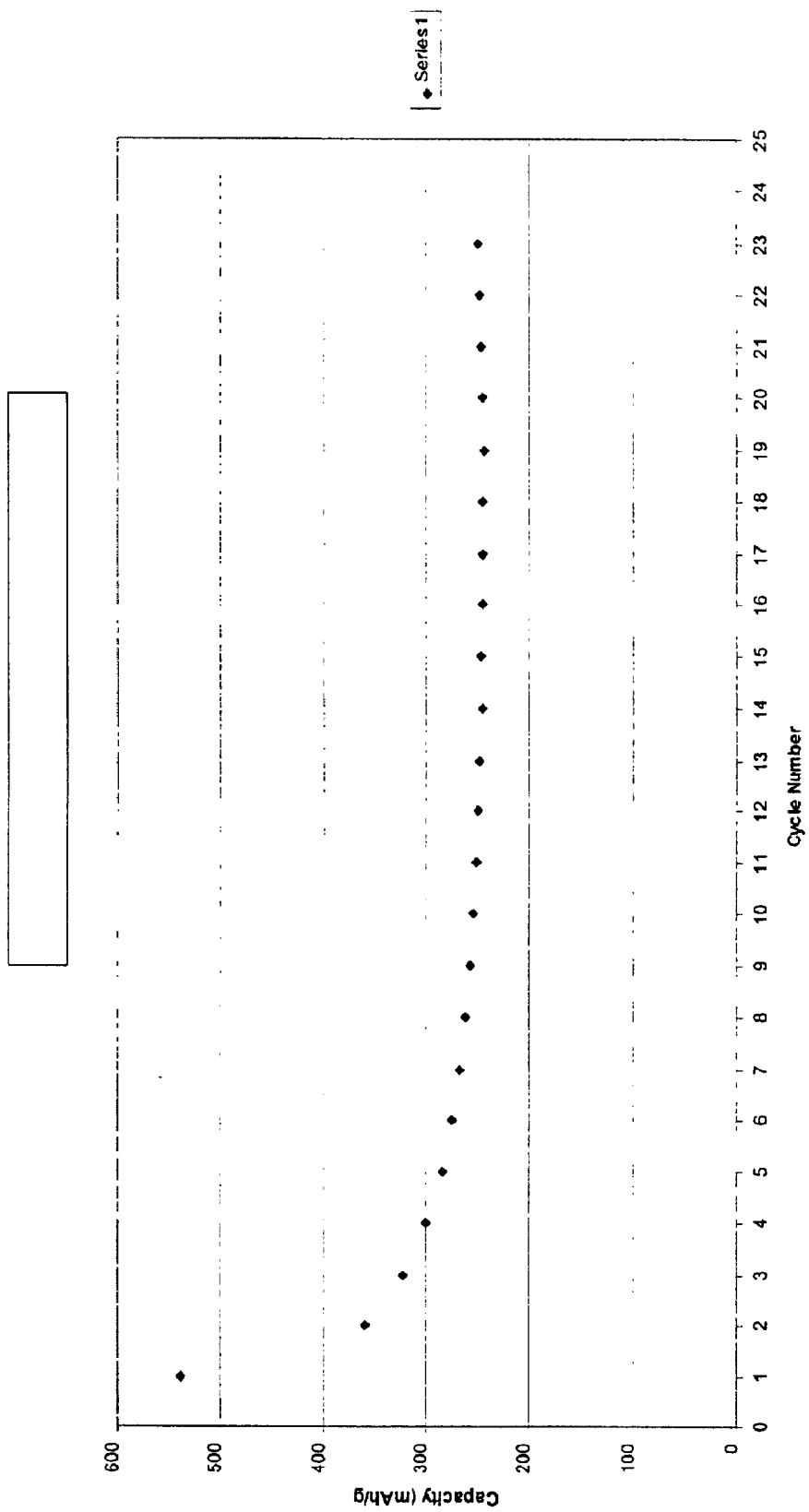
FIG. 7 depicts a plot of capacity vs. cycle number for the first 23 cycles of the Li/$Mn_2Sb$ cell of FIG. 6.

Laminates of $Mn_2Sb$ electrodes were fabricated by the same procedure described in Example 2 for $Cu_2Sb$. For the electrochemical evaluation, $Li/Mn_2Sb$ cells of size 2016 (i.e., 20 mm diameter; 1.6 mm high) were used. Cells were cycled in galvanostatic mode between 1.5 and 0 V using a current density of 0.4 mA on an automated Maccor cell testing system. The voltage profile for the first cycle of a typical $Li/Mn_2Sb$ cell is shown in FIG. 6. The capacity versus cycle number plot for the first 25 cycles of this cell, cycled between 1.5 and 0 V is shown in FIG. 7.

The X-ray diffraction data of a $Li/Cu_2Sb$ cell were obtained in situ at intermittent intervals during the initial discharge and charge. The voltage profile of this cell is shown in FIG. 2, in which points A to J indicate the voltages at which the X-ray data were collected; the corresponding X-ray diffraction patterns are provided in FIG. 3. Peaks in the diffraction patterns that originate from the cell hardware, such as the copper current collector and the aluminum foil container, are marked in the figure. The voltage profile is divided into sections I–VII, which indicate the various stages of the reaction. Before cycling, the open-circuit voltage of the $Li/Cu_2Sb$ cell was 3.0 V and at 1.05 V. The X-ray diffraction peaks from the initial $Cu_2Sb$ electrode are visible at approximately 26, 29, 31.5, and 35° 2θ; additional peaks from $Cu_2Sb$ between 44° and 45° 2θ are overlapped by peaks from the cell hardware. The $Cu_2Sb$ peaks remain unchanged during discharge down to 1.05 V (Point A). Section I, between 3.0 and 0.9 V in the voltage profile, accounts for a capacity of approximately 90 mAh/g which is lost on the subsequent cycle. This loss in capacity is attributed to the reaction of lithium with an electrochemically active surface of the $Cu_2Sb$ particles, possibly an oxide that is formed during the synthesis of $Cu_2Sb$ by ball-milling. At 0.82 V (point B), the end of section II, the $Cu_2Sb$ peaks are replaced by new peaks at approximately 25, 41 and 48° 2θ; these peaks are consistent with a cubic structure having a CuSb zinc-blende-type framework. On further discharge to point D at 0.70 V (Section III), via point C at 0.74 V, the diffraction peaks of the lithiated electrode shift very gradually towards lower 2θ. Sections II and III are, therefore, attributed to an electrode system $Li_xCu_{2-y}Sb$ ($0<x\leq2$, $0\leq y\leq1$) with end member $Li_2CuSb$ at x=2, y=1. At 0.70 V, a voltage plateau (Section IV) signifies the onset of a two-phase reaction consistent with the formation of a $Li_{2+z}Cu_{1-z}Sb$ structure ($0<z<1$), closely related to $Li_3Sb$, as evident by the peaks that appear at approximately 23, 27, 39 and 46° 2θ at the expense of the $Li_2CuSb$ peaks, that become more pronounced on further discharge to 0.61 V and 0.41 V in FIG. 3. At 0.61 V (point E) and at lower voltages (point F) only the $Li_{2+y}Cu_{1-y}Sb$ phase is present (this is also true when cells reach 0 V, not shown in FIG. 3. The capacity at the lower potentials is attributed to the continued extrusion of Cu from the structure, yielding the final discharge products $Li_3Sb$ and Cu at y=1 and $Li_{2+y}Cu_{1-y}Sb$. The extruded copper could not be detected in the X-ray diffraction patterns because they coincide with those of the copper current collector. High resolution images of the lithiated $Cu_2Sb$ electrodes obtained on a transmission electron microscope have shown that the extruded Cu remains closely connected to the antimony matrix as very small needle-like crystals, a few hundred nanometers in length; this feature is believed, to be amongst the reasons for the excellent reversibility of cells when cycled between 1.2 and 0 V, as shown in FIG. 4.

The crystallographic parameters for $Cu_2Sb$ (pristine electrode), "$Li_2CuSb$" calculated at 0.7 V (FIG. 3) and "$Li_3Sb$" calculated at 0.41 V (FIG. 3) are provided in Table 1. "$Li_2CuSb$" and "$Li_3Sb$" are put in parentheses because the precise compositions of the electrodes at which the lattice parameters were calculated are not known. Nevertheless, the calculated values in Table 1 are in good agreement with those reported previously in the literature for $Cu_2Sb$, a=3.992 Å, c=6.091 Å; $Li_2CuSb$, a=6.268 Å; and $Li_3Sb$, a=6.573 Å. Using the crystallographic parameters in Table 1, the volume expansion for the transition of $Cu_2Sb$ to "$Li_2CuSb$" is 25.2%. During the cubic-cubic transition of "$Li_2CuSb$" to "$Li_3Sb$", the unit cell parameter, a, increases by 4.3%, corresponding to a unit cell volume expansion 13.3%. The total volume expansion of the Sb array for the complete $Cu_2Sb$ to "$Li_3Sb$" transformation is 42%.

TABLE 1

Crystallographic parameters for $Cu_2Sb$, $Li_2CuSb$ and $Li_3Sb$.

| Compound | Space Group | a (Å) | b (Å) | c (Å) | Z | Unit Cell Volume (Å³) |
|---|---|---|---|---|---|---|
| $Cu_2Sb$ | P4/nmm | 4.03(1) | 4.03(1) | 6.10(12) | 2 | 99 |
| "$Li_2CuSb$" | F-43m | 6.28(2) | 6.28(2) | 6.28(2) | 4 | 248 |
| "$Li_3Sb$" | Fm3m | 6.55(1) | 6.55(1) | 6.55(1) | 4 | 281 |

The electrochemical processes that occur in sections II, III and IV are reversible; during charge, in region V, the in-situ X-ray diffraction data show that the $Li_2CuSb$ phase is reformed by 0.93 V (point G, FIG. 3). Further delithiation to 1.01 V (region VI, to point I), shows a gradual shift of the $Li_2CuSb$ peaks towards higher 2θ consistent with the formation of $Li_{2-x}Cu_{1+y}Sb$ compositions (0<x<2, 0≦y<1). The X-ray diffraction data obtained for the final process to 1.05 V (region VII, to point J) are consistent with the regeneration of a $Cu_2Sb$-type structure.

A capacity vs. cycle plot for the first 25 cycles of a $Li/Cu_2Sb$ cell is provided in FIG. 4. The first cycle has a large irreversible capacity, consistent with the data from the in-situ cell (FIG. 1). Thereafter, $Cu_2Sb$ shows excellent cycling stability with a steady capacity of approximately 290 mAh/g. On the initial conditioning cycle, there is a 36% capacity loss, whereas from cycle 2 to cycle 25 the capacity loss is 0.33% per cycle, and from cycle 4 to 25 it is 0.14% per cycle. The theoretical gravimetric capacity for the complete reaction $$3Li + Cu_2Sb \rightarrow Li_3Sb + 2Cu \quad (2)$$

is 323 mAh/g. Therefore, the delivered rechargeable capacity of 290 mAh/g reflects a very high utilization of the electrode (90%). The crystallographic density of $Cu_2Sb$ is high (8.51 g/ml), whereas the density of the $Li_3Sb/Cu$ composite electrode at the end of discharge is considerably lower (4.70 g/ml). The theoretical volumetric capacity for $Cu_2Sb$, based on the average density of the electrode (6.60 g/ml) is 2132 mAh/ml, which is significantly higher than the theoretical volumetric capacity of graphite (818 mAh/ml), which is the preferred negative electrode for current Li-ion cells.

With the available in situ X-ray diffraction and crystallographic data, the following reaction sequence for the lithiation of $Cu_2Sb$, which is represented schematically in FIGS. 8(a)–(d) is proposed. The projections of the structures in FIGS. 8(a)–(d) and compositions of the products have been selected to simplify the illustration of the overall reaction model. In this respect, it is acknowledged that, because of the easy exchange between Li and Cu atoms in $Li_x Cu_{2-y}Sb$ structures (x≦3, y≦2), deviations from the ideal stoichiometric compositions, as illustrated in FIGS. 8(a)–(d), can be expected.

The first stage of the reaction of lithium with $Cu_2Sb$ (Sections II and III in FIG. 2) during which there is a transformation to a cubic CuSb zinc-blende framework can be represented $$xLi + Cu_2Sb \rightarrow Li_xCu_{2-y}Sb + yCu \quad (3)$$

Figure 8:
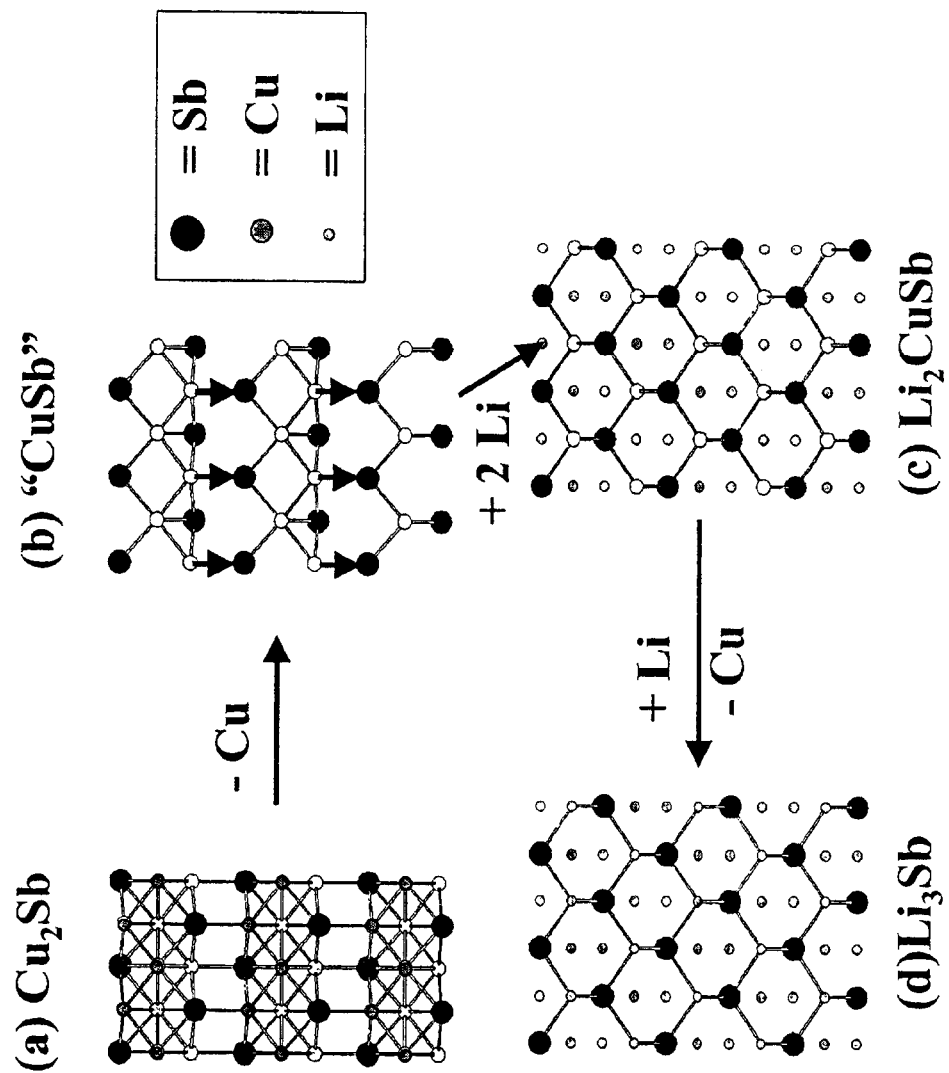
FIGS. 8(a)–(d) depict schematic illustrations of the structures formed during the electrochemical transformation of $Cu_2Sb$ to $Li_3Sb$ with FIG. 8a being in the 100 projection and FIG. 8c being in the 110 projection.

for 0<x≦2, 0<y<1, yielding $Li_2CuSb$ at x=2 and y=1. The $Cu_2Sb$ structure is tetragonal (space group P4/nmm) with Cu located on the 2a(000) and 2c(0½0.27) sites, and Sb on the 2c(0½0.70) site. Therefore, in the [100] projection, the $Cu_2Sb$ structure can be visualized as being comprised of Cu layers with alternating layers of Cu and Sb (FIG. 8a); the Cu and Sb atoms are arranged in discrete columns down the a axis of the unit cell. The following processes occur during the transformation of $Cu_2Sb$ to the CuSb zinc-blende framework, as shown in FIG. 8(a–c): 1) the Sb atoms, that are arranged in a slightly distorted face-centered array in the parent tetragonal $Cu_2Sb$ structure undergo small displacements to create an ideal face-centered-cubic array in the CuSb zinc-blende framework; 2) one-half of the copper atoms are extruded from the $Cu_2Sb$ structure; 3) one-quarter of the copper atoms remain essentially in their original positions, and one-quarter are displaced in the a and c directions of the $Cu_2Sb$ unit cell to create the puckered hexagons of the CuSb zinc-blende framework as shown in a [110] projection in FIG. 8c; 4) the Sb and Cu displacements cause a compression of the c-axis and an expansion of the a-axis in $Cu_2Sb$ to yield the cubic CuSb zinc-blende framework; 5) for every extruded Cu atom, two Li atoms are accommodated in the interstitial space of the CuSb framework to yield $Li_2CuSb$ (space group F-43m), which is isostructural with $Li_2CuSn$, derived by lithiation of $Cu_6Sn_5$ with a NiAs-type structure as reported by Kepler et al in Electrochemical Solid State Letters, Volume 2, page 307 (1999). FIG. 8(a–c) demonstrate that there is a strong structural relationship between the parent $Cu_2Sb$ and the CuSb zinc-blende framework as there is between $Cu_6Sn_5$ and the CuSn zinc-blende framework. In this respect, it should be noted that in the hexagons of the CuSb framework, all the Sb atoms and one-half of the Cu atoms are close to their original positions in the parent $Cu_2Sb$ structure.

The electrochemical profile and the lattice parameter of the $Li_xCu_{2-y}Sb$ electrode shown in Sections II and III, in FIG. 2 and 3, respectively, show more variation than would be suggested by a simple two-phase $Cu_2Sb$-$Li_2CuSb$ system. A least squares refinement of the lattice parameter at point B at 0.82 V in FIG. 3, yielded a value of a=6.26(1) Å, which is 0.3% less than that calculated for "$Li_2CuSb$" at point D at 0.7 V (6.28(2) Å, Table 1).

The second stage of the reaction of lithium with $Cu_2Sb$ (Section IV, FIG. 2) occurs first on a voltage plateau at approximately 0.7 V, and then with sloping voltage to 0 V; this stage is attributed to the substitution of copper by lithium in the face-centered-cubic Sb array as shown in a [110] projection in FIG. 8(c). The reaction for the complete substitution of Cu by Li is:

$$Li + Li_2CuSb \rightarrow Li_3Sb + Cu \quad (4)$$

However, the electrochemical profile and X-ray diffraction data in FIGS. 2 and 3 suggest that reaction (4) occurs by a similar inhomogeneous process of lithium insertion and copper extrusion described for reaction (3) above. Reaction (4) can, therefore, be written more generally as:

$$yLi + Li_2CuSb \rightarrow Li_{2+y}Cu_{1-y}Sb + yCu \quad (5)$$

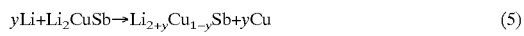

for 0<y≦1). The precise composition of the reaction product for the two-phase process at 0.7 V, (i.e., the value of y) is unknown; the lattice parameter determined from the in situ X-ray diffraction data (e.g., a=6.55(1) Å at 0.41 V, Table 1) suggest a composition close to $Li_3Sb$ (a=6.573 Å). Between 0.7 and 0 V, it appears that the residual Cu is extruded continuously from the $Li_{2+x}Cu_{1-x}Sb$ electrode structure to yield $Li_3Sb$ (space group Fm3m, FIG. 8d); a small contribution to the capacity from the added acetylene black current collector over this voltage range cannot be discounted.

Therefore, Li/Cu$_2$Sb cells operate by a mechanism involving lithium insertion/copper extrusion reactions with the Cu$_2$Sb electrode. The overall reaction can be described by the general process:

$$xLi + Cu_2Sb \leftrightharpoons Li_xCu_{2-y}Sb + yCu \qquad (6)$$

for $0<x\leq 3$ and $0<y\leq 2$. The excellent cycling stability of the cells in which the Cu$_2$Sb electrode provides a rechargeable capacity of 290 mAh/g (alternatively, 1914 mAh/ml based on an average electrode density of 6.6 g/ml) can be attributed to two main factors. First, there are strong structural relationships between the lithium-copper-antimony phases, Cu$_2$Sb, Li$_2$CuSb and Li$_3$Sb formed during the electrochemical discharge and charge reactions, the compositions of which can vary because of the possible exchange of Li for Cu in the Sb array. Of particular significance is the retention of an essentially invariant host Sb array for Li and Cu throughout the reaction process. Second, the Cu$_2$Sb electrode from which finely divided copper is extruded provides good electronic conductivity at all states of charge, thereby providing an electrode with low cell impedance and fast reaction kinetics.

The X-ray diffraction data of a Mn$_2$Sb electrode is shown in FIG. 5; the voltage profile of the first cycle of a lithium cell containing this electrode is shown in FIG. 6. Although in situ X-ray diffraction data collected to date have not revealed the precise nature of the intermediate discharge products that are formed above the plateau at 0.4 V in FIG. 6, the X-ray data have shown that Li$_3$Sb is formed on a flat voltage plateau at approximately 0.4 V and between 0.4 V and 0 V. Capacity can be recovered during the charge process, but with considerably greater hysteresis than observed for Cu$_2$Sb electrodes. This hysteresis can be attributed to slower diffusion of Mn atoms within the Sb array of the electrode structure compared to Cu atoms. In situ X-ray diffraction data collected during the charge process to 1.5 V in FIG. 6 have indicated that LiMnSb- and MnSb-type structures may form as intermediate products during the charge process and that the regeneration of Mn$_2$Sb is more difficult to achieve than is the case for Cu$_2$Sb electrodes. Nevertheless, after one conditioning cycle Mn$_2$Sb electrodes can deliver a rechargeable capacity in excess of 240 mAh/g for 23 cycles as shown in FIG. 7. These electrochemical data emphasize the superior electrochemical performance of Cu$_2$Sb electrodes over Mn$_2$Sb electrodes, thereby making Cu$_2$Sb a preferred electrode material.

Figure 9:
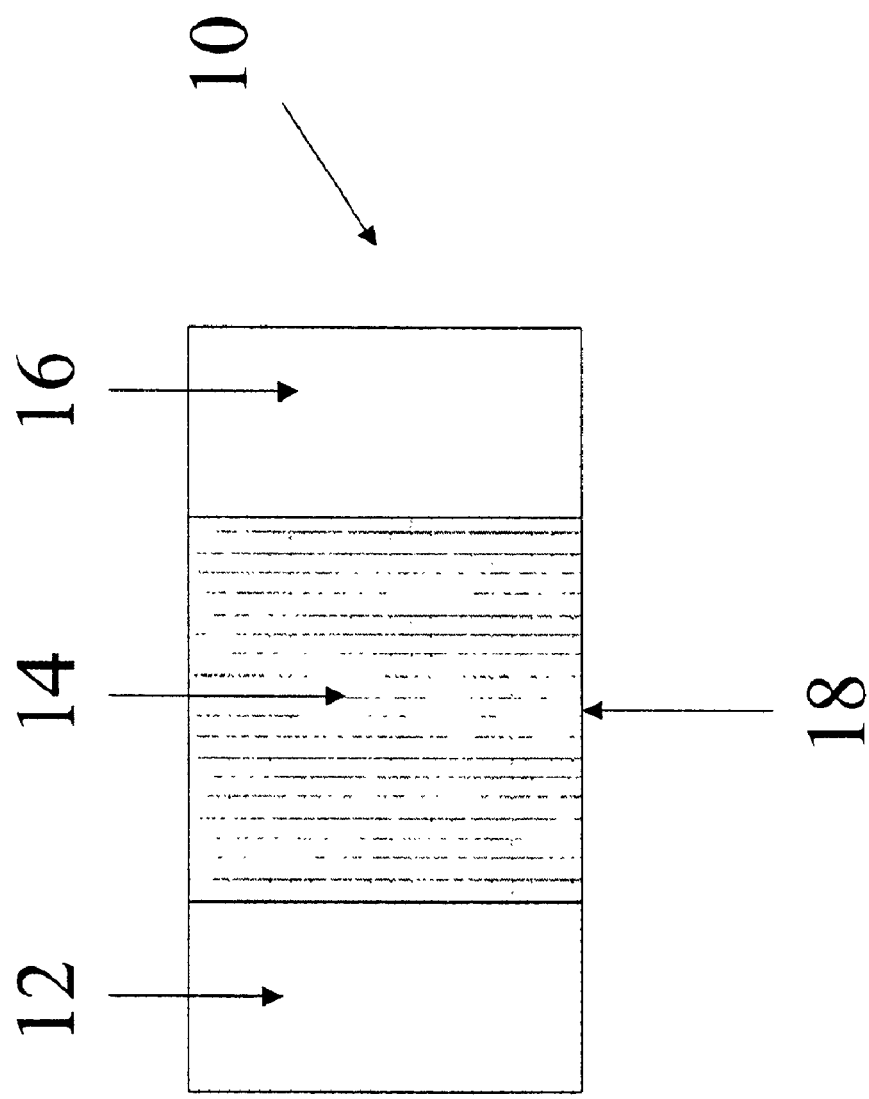
FIG. 9 depicts a schematic representation of an electrochemical cell.
Figure 10:
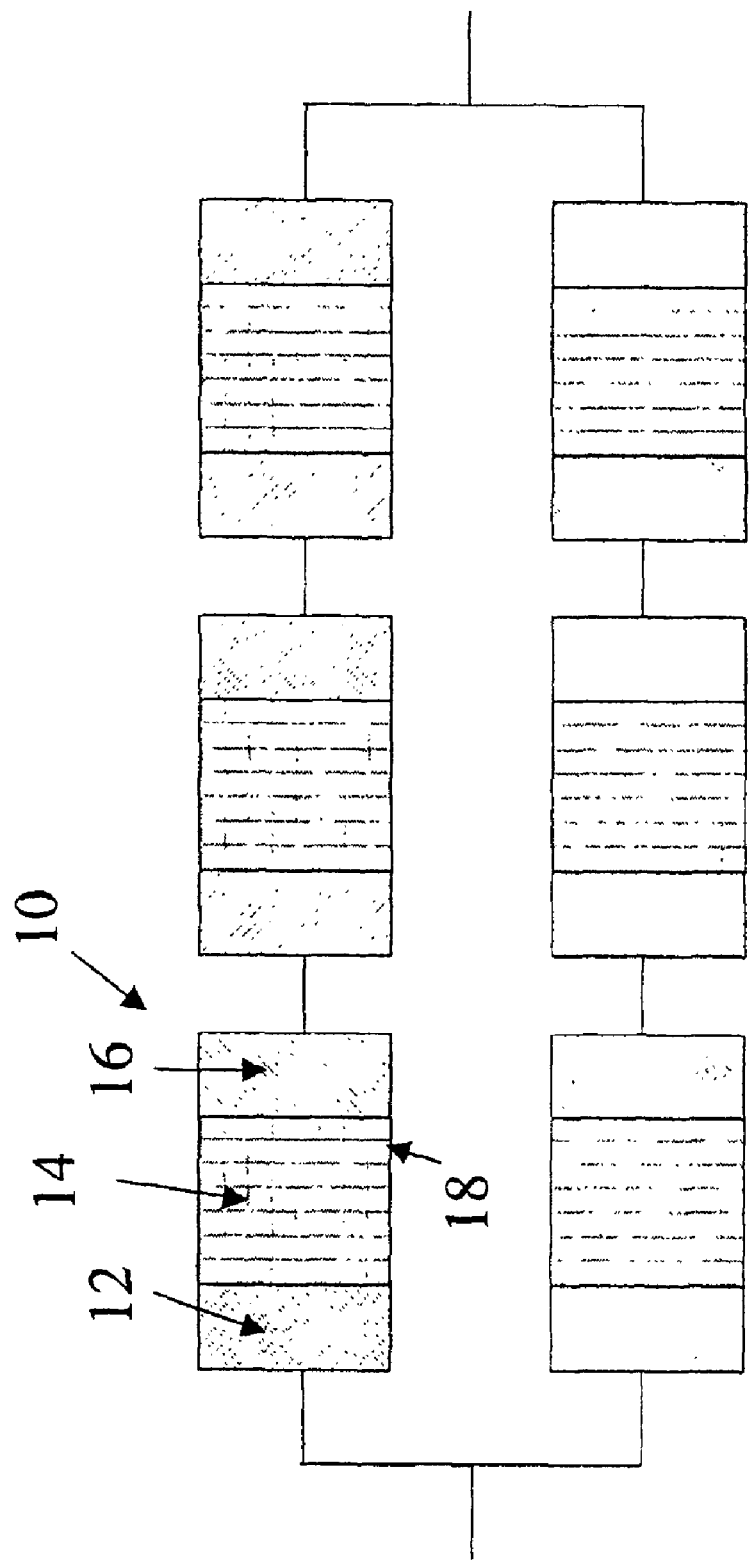
FIG. 10 depicts a schematic representation of a battery consisting of a plurality of cells connected electrically in series and in parallel.

This invention, therefore, relates to an intermetallic negative electrode (anode) for a non-aqueous electrochemical lithium cell as shown schematically in FIG. 9, the cell represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with both the electrolyte and the negative and positive electrodes are well known in the art and are not described herein, but are included as is understood by those of ordinary skill in this art. FIG. 10 shows a schematic illustration of one example of a battery in which two strings of electrochemical lithium cells 10, described above, are arranged in parallel, each string comprising three cells arranged in series.

While particular embodiments of the present invention have been shown and described, it will be appreciated by those skilled in the art that changes and modifications may be made without departing from the true spirit and scope of the invention.

The embodiments of the invention in which an exclusive property or privilege is claimed are defined as follows:

1. A negative electrode for a non-aqueous electrochemical cell having an active material consisting essentially of an intermetallic compound which is crystalline in its initial state having as its basic structural unit the formula M$_2$M' in which M and M' are selected from two or more metal elements including Si, and the M$_2$M' structure is a Cu$_2$Sb-type structure.

2. A negative electrode of claim 1, in which M$_2$M' has a fully disordered structure or a partially disordered structure.

3. A negative electrode of claim 1, in which M$_2$M' is a non-stoichiometric compound in which the M:M' ratio falls within the range 2.33:1 to 1.67:1.

4. A negative electrode of claim 3, in which M$_2$M' is a non-stoichiometric compound in which the M:M' ratio falls within the range 2.1:1 to 1.9:1.

5. A negative electrode of claim 1, in which M is Cu, Mn and/or Li, and M' is Sb.

6. A negative electrode of claim 5, in which the Li content if present is 20 atom percent or less of the M$_2$M' structure.

7. A negative electrode of claim 1, in which M$_2$M' is Cu$_2$Sb or Mn$_2$Sb.

8. A negative electrode of claim 1, in which Li is added as a separate component to the M$_2$M' electrode to the extent of 20 atom percent or less of the M$_2$M' structure.

9. A negative electrode of claim 1, in which surplus M metal is added to the M$_2$M' electrode, to the extent of 50 atom percent or less.

10. A negative electrode of claim 9, in which the surplus M metal is 20 atom percent or less.

11. A negative electrode for a non-aqueous electrochemical cell having an active material consisting essentially of a compound which is crystalline in its initial state having as its basic structural unit the formula M$_2$M', and having a Cu$_2$Sb-type structure, in which M is one or more metal elements and M' is one or more metal or non-metal elements.

12. A negative electrode of claim 11, in which the M' atoms are selected from the Group Va elements excluding nitrogen.

13. A negative electrode of claim 12, in which the M' atoms are selected from P or As.

14. A non-aqueous electrochemical cell comprising a negative electrode, an electrolyte and a positive electrode the negative electrode having an active material consisting essentially an intermetallic compound which is crystalline in its initial state having as its basic structural unit the formula M$_2$M' in which M and M' are selected from two or more metal elements including Si, and the M$_2$M' structure is a Cu$_2$Sb-type structure.

15. A battery comprised of a plurality of cells, at least some cells including a negative electrode and a non-aqueous electrolyte and a positive electrode, said negative electrode having an active material consisting essentially of an intermetallic compound which is crystalline in its initial state having as its basic structural unit the formula M$_2$M' in which M and M' are selected from two or more metal elements including Si, and having a Cu$_2$Sb-type structure.

16. A non-aqueous electrochemical cell comprising a negative electrode, an electrolyte and a positive electrode, said negative electrode having an active material consisting essentially of an intermetallic compound which is crystalline in its initial state having as its basic structural unit the formula M$_2$M', and having a Cu$_2$Sb-type structure, in which M is one or more metal elements and M' is one or more metal or non-metal elements.

17. A battery comprising a plurality of cells, at least some cells including a negative electrode and a non-aqueous electrolyte and a positive electrode, said negative electrode having an active material consisting essentially of an intermetallic compound which is crystalline in its initial state having as its basic structural unit the formula $M_2M'$, and the $M_2M'$ structure is a $Cu_2Sb$-type structure, in which M is one or more metal elements and M' is one or more metal or non-metal elements.

18. The negative electrode of claim 1, wherein the intermetallic compound is made by ball milling of the metal elements M and M'.

19. The negative electrode of claim 18, wherein the ball milling is at ambient temperature in air in the presence of a lubricating agent.

20. The negative electrode of claim 19, wherein the lubricating agent is graphite.

21. A negative electrode for a non-aqueous electrochemical cell comprised of an intermetallic compound which is crystalline in its initial state having an x-ray diffraction pattern substantially the same as FIG. 3.

22. A negative electrode for a non-aqueous electrochemical cell comprised of an intermetallic compound which is crystalline in its initial state having an x-ray diffraction pattern substantially the same as FIG. 5.

* * * * *